(No Model.)
F. C. WOLF & G. DANIELS.
JOURNAL BEARING LUBRICATOR.
No. 512,423. Patented Jan. 9, 1894.
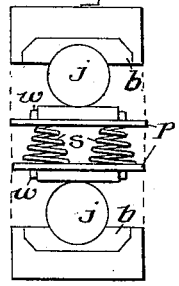
Fig. 5.
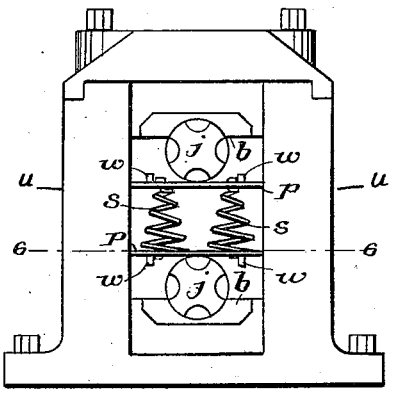
Fig-1-
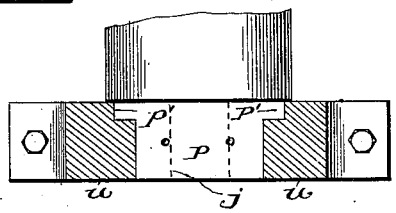
Fig-6.
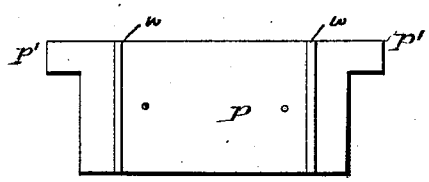
Fig-2-
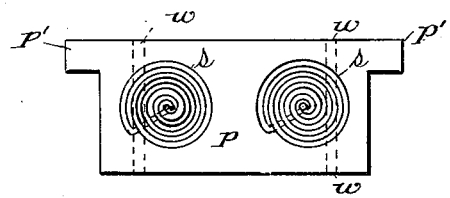
Fig-3-
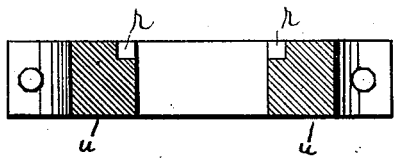
Fig-4-
WITNESSES
C. C. Woodworth
G. W. Tucker
INVENTORS:
Frederick C. Wolf
George Daniels By C. C. Woodworth
Attorney

UNITED STATES PATENT OFFICE.

FREDDRICK C. WOLF AND GEORGE DANIELS, OF YOUNGSTOWN, OHIO.

JOURNAL-BEARING LUBRICATOR.

SPECIFICATION forming part of Letters Patent No. 512,423, dated January 9, 1894.

Application filed December 28, 1892. Serial No. 456,612. (No model.)

*To all whom it may concern:*

Be it known that we, FREDDRICK C. WOLF and GEORGE DANIELS, citizens of the United States, residing at Youngstown, in the county of Mahoning and State of Ohio, have invented certain new and useful Improvements in Journal-Bearing Lubricators; and we do hereby declare the following to be a full, clear, and exact description of our invention, such as will enable others skilled in the art to which it appertains to make and use the same, reference being had to the accompanying drawings, which form part of this specification.

Our invention relates to that class of journal-bearing lubricators that apply mechanically the lubricant from a storage within the box, and its object is a continuous self feed lubricator that is of simple construction and that will lubricate all parts of the friction surfaces of the journal and bearing equally and continuously, and without need of attention, except at long intervals to renew the storage of lubricating material, whereby time and labor is economized, and the expensive and often disastrous consequences following the imperfect lubrication of journals and bearings can never arise.

While, as will presently appear, my device may be applied in many uses of journals and bearings, as for instance in car and engine wheels, yet we have illustrated it only as applied in friction rolls for rolling metal, for which use it is more particularly designed.

In the drawings Figure 1 is an elevational view of the side of a friction roll housing showing our invention in place therein. Fig. 2 is a view of the walled face of a plate $p$. Fig. 3 is a view of the other face of a plate $p$ showing the spiral springs $s$ $s$ attached. Fig. 4 is a transverse sectional view of the housing showing the rabbets $r$ $r$ in the uprights $u$ $u$. Fig. 5 is a view similar to Fig. 1, the pillar or support being removed, showing the plates compressed and the lubricant in position, and Fig. 6 is a detail section on the line 6—6 of Fig. 1 showing the relative position of the roller, the latter being broken away just inside the pillar.

It will be seen that our invention consists of the two similar flat metal plates $p$ $p$ with the spiral springs $s$ $s$ placed between them and rigidly attached to both, the whole having place in the space in the housing, that is horizontal between the two pillars or uprights $u$, $u$, and vertical between the roll necks or journals $j$ which have only partial bearings in the brasses $b$. The similar flat metal plates $p$ $p$ are rectangular in form carrying rectangular projections $p'$ from the right and left edges at the corners of one end to fit movably into the vertical rabbets $r$ $r$ in the inner corners that are nearer the ends of the roll necks $j$ of the uprights, to hold them against horizontal movement in one direction, the roll ends being relied upon to hold them against such movement in the other direction. A tongue and groove would also prevent such horizontal movement, and would be the equivalent of the means described. Longitudinally across the surface of each plate $p$ appear the two similar and parallel walls $w$ $w$ sufficiently sundered that, when the plates are in place, the journal opposite is something more than covered by the space between them, the height being something less than one half the journal diameter. The object of the walls $w$ $w$, which in each plate faces a journal, is to counteract the tendency of the lubricant to mass in that portion of the chamber it occupies that is upon the side that is in the line of direction of the journal movement in its uncovered part, and also to hold the lubricating material when approaching exhaustion in contact with the journal. The spiral springs $s$ $s$ are rigidly attached at each end to the surfaces of the plates $p$ $p$ that are opposite to the walls $w$ $w$ at suitable locations to maintain an equal distance between the plates $p$ $p$ at all points, and are, preferably, conical as shown in the drawings, or helical, in order that the plates $p$ $p$ may be brought into close proximity to give greater spaces for the storage of the lubricant. The springs are selected with care so that they will effectually perform the part for which designed, and yet be not sufficiently powerful to force the lubricating material from its places of storage. We do not limit ourselves to this form of spiral spring, or to the use of any specified number between the plates, as it is apparent that any spiral spring, as well as any number of them, may be used with good, although not the best, results.

The mechanism and operation of our continuous feed lubricator will now be understood and its advantages appreciated. In storing the lubricant, solid matter such as suet or tallow being used, the plates $p$ $p$ are brought closely together and the spaces above the upper plate and below the lower plate are filled. The force of the springs presses the lubricant mass equally against all exposed parts of the journals, and the rotations of the journals carry particles of it, softened by attrition, between them and the bearing surfaces of the brasses, so that, the impacted mass of lubricating substance being pressed onward as it is worn away, a perfect and constant lubrication takes place, without care or attention as long as the lubricating substance remains unexhausted. It will also be seen that in friction rolls for rolling metal our lubricating device is especially valuable as when in rolling different thicknesses of metal, or when by accident, as often happens, knots or twists occur in the metal, the upper roll rises and falls, the lubrication still goes on the same and as perfectly as if the upper roll was at a stationary elevation. It is well known to the operators of friction rolls that, if the journals of the upper rolls are permitted to become dry, upon the occurrence of a knot or twist in the iron, the roll often ceases to revolve, resulting in a "burn," which totally destroys the roll. It will also be seen that to apply our invention to a single journal, or to journals and bearings differing in manner of blocking from friction rolls, the variations required will involve only mechanical skill.

What we claim is—

1. The combination, with a pair of journals, of two similarly constructed plates disposed in parallel relation and located between the said journals, and having walls $w$ on the faces opposing the respective journals, and springs located between the said plates and adapted to press them apart and toward the respective journals, substantially as and for the purpose described.

2. The combination, with parallel uprights having co-incident rabbets in their opposing corners, a pair of journals, two parallel plates arranged between the said journals, and having oppositely extending projections at the inner edges to work in the said rabbets, and having walls $w$ on the faces opposing the respective journals, and springs placed between and secured at their ends to the said plates and arranged to press the said plates apart and toward the journals, substantially as described.

In testimony whereof we hereunto affix our signatures in the presence of two witnesses.

FREDDRICK C. WOLF.
GEORGE DANIELS.

Witnesses:
CHAS. G. RAND,
CLAYTON BALDWIN.